United States Patent
Minatogawa (10) Patent No.: US 7,679,579 B2
(45) Date of Patent: Mar. 16, 2010

(54) PROJECTION TYPE IMAGE DISPLAY APPARATUS

(75) Inventor: Hiroshi Minatogawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1118 days.

(21) Appl. No.: 11/313,939

(22) Filed: Dec. 22, 2005

(65) Prior Publication Data

US 2006/0139236 A1    Jun. 29, 2006

(30) Foreign Application Priority Data

Dec. 24, 2004   (JP) ............................ 2004-373877

(51) Int. Cl.
G09G 3/00   (2006.01)
(52) U.S. Cl. .......................... 345/32; 372/29.01; 353/85
(58) Field of Classification Search .................. 345/32; 372/24, 29.01; 353/85, 98, 122; 359/201, 359/202, 212

See application file for complete search history.

(56) References Cited

U.S. PATENT DOCUMENTS

| | | | |
|---|---|---|---|
| 6,460,999 B1 * | 10/2002 | Suzuki | 353/79 |
| 6,575,581 B2 * | 6/2003 | Tsurushima | 353/121 |
| 6,869,185 B2 * | 3/2005 | Kaminsky et al. | 353/31 |
| 7,252,394 B1 * | 8/2007 | Fu | 353/98 |
| 7,325,933 B2 * | 2/2008 | Kaise et al. | 353/97 |
| 7,364,309 B2 * | 4/2008 | Sugawara et al. | 353/85 |

FOREIGN PATENT DOCUMENTS

JP     2000-267621 A     9/2000

* cited by examiner

*Primary Examiner*—Richard Hjerpe
*Assistant Examiner*—Tom V Sheng
(74) *Attorney, Agent, or Firm*—Birch, Stewart, Kolasch & Birch, LLP (57) ABSTRACT

A projection unit comprises a laser diode (LD) for emitting a laser beam, and a LD control section for controlling the LD. The laser beam emitted from the LD is scanned in horizontal and vertical directions respectively by first and second micro mirrors, and is projected on a projection surface through a projection window. Thus, images are displayed on the projection surface. An infrared sensor is disposed near the second micro mirror. The infrared sensor is disposed such that its light receiving surface faces the projection window, and detects human presence around a projection area of the laser beam. The LD control section does not start outputting the laser beam when the infrared sensor detects human presence. Also, the LD control section stops outputting the laser beam when the infrared sensor detects human presence while the image is being displayed.

5 Claims, 9 Drawing Sheets

PROJECTION TYPE IMAGE DISPLAY APPARATUS

BACKGROUND OF THE INVENTION

1. Field of the Invention

The present invention relates to a projection type image display apparatus which projects a laser beam on a screen to display images.

2. Background Arts

A projection type image display apparatus, which modulates a laser beam with image data and projects the modulated laser beam on a screen to display images, is disclosed in, for instance, the Japanese patent laid-open publication No. 2000-267621. Since the laser beam has high energy, it may cause serious harm, such as burns, deterioration of eyesight or even blindness when a human body is directly irradiated with the laser beam.

The projection type image display apparatus disclosed in the Japanese patent laid-open publication No. 2000-267621 is a rear projection type to project the laser beam from the rear side of the screen. This projection type image display apparatus converts the laser beam emitted from a laser source into a broad beam by a lens and modulates the broad laser beam by a liquid crystal panel to project it on the screen. When the beam conversion is performed properly, the intensity of the laser beam becomes low and the optical energy is reduced. Therefore, it does not cause any harm even if the human body is irradiated with such laser beam, which has passed through the screen. However, if the intensity of the laser beam is maintained high due to fault in the beam conversion, the laser beam may be hazardous to the human body.

The projection type image display apparatus such as described above has a sensor disposed in a projection area of the laser beam on the screen for detecting the intensity of the laser beam being projected on the screen. When the intensity of the laser beam is high, the projection type image display apparatus stops outputting the laser beam or reduces the intensity of the laser beam.

In the rear projection type image display apparatus, the laser source including a laser optical system is placed in a case, and the screen is arranged in front of the case. The laser beam irradiated on the human body has already passed through the screen, therefore the energy of the laser beam is relatively low. In contrast to this, in a front projection type image display apparatus to project the laser beam from the front side of the screen, the laser beam emitted from the laser source can be directly irradiated on the human body, so it is dangerous. For this reason, countermeasures against the laser beam hazards to the human body are desired especially in the front projection type image display apparatus.

SUMMARY OF THE INVENTION

In view of the foregoing, an object of the present invention is to provide a projection type image display apparatus which can prevent that a laser beam is accidentally irradiated on a human body.

To achieve the above and other objects, the projection type image display apparatus of the present invention includes a human detector for detecting human presence in a detection area including a projection area of a laser beam extending from a projection window of a main body to a projection surface and a peripheral area around the projection area, and a laser beam power controller for controlling an output of the laser beam from the laser beam emitting section when the human detector detects human presence in the detection area.

It is preferable that the laser beam power controller controls a power level of the laser beam to a predetermined level or stops outputting the laser beam when the human detector detects human presence in the detection area while the laser beam is being outputted. It is also preferable that the laser beam power controller starts outputting the laser beam from the laser beam emitting section after investigating human presence in the detection area with using the human detector.

The detection area on the projection surface includes the projection area of the laser beam and the peripheral area around it. The margin of the peripheral area is 25% of the length and width of the projection area.

An infrared sensor is utilized as the human detector and its light receiving angle is larger than maximum projection angle of the laser beam projected through the projection window. The infrared sensor is disposed near a projection axis of the laser beam.

The light emitting section includes a laser source for emitting the laser beam, a first laser beam deflector and a second laser beam deflector. The first laser beam deflector receives a one-dimensional laser beam emitted from the laser source for scanning it either in a horizontal or a vertical direction. The second laser beam deflector receives the laser beam from the first laser beam deflector for scanning it in the other direction. The infrared sensor is disposed behind the second deflector and aligned to the projection axis of the laser beam projected through the projection window.

It is preferable that a spacing between the infrared sensor and the second deflector is designated such that a blind area, which is created in the detection area of the infrared sensor due to the second deflector disposed in front of the infrared sensor casting a shadow on the projection surface, is included within the projection area of the laser beam on the projection surface.

The projection type image display apparatus of the present invention controls the output of the laser beam emitting section when human presence is detected in the detection area including the projection area of the laser beam extending from the projection window to the projection surface and a periphery around the projection area. Owing to this, it is prevented that the laser beam is accidentally irradiated on the human body.

BRIEF DESCRIPTION OF THE DRAWINGS

For a more complete understanding of the present invention, and the advantage thereof, reference is now made to the following descriptions taken in conjunction with the accompanying drawings, in which.

DETAILED DESCRIPTION OF THE PREFFERED EMBODIMENTS

Figure 1:
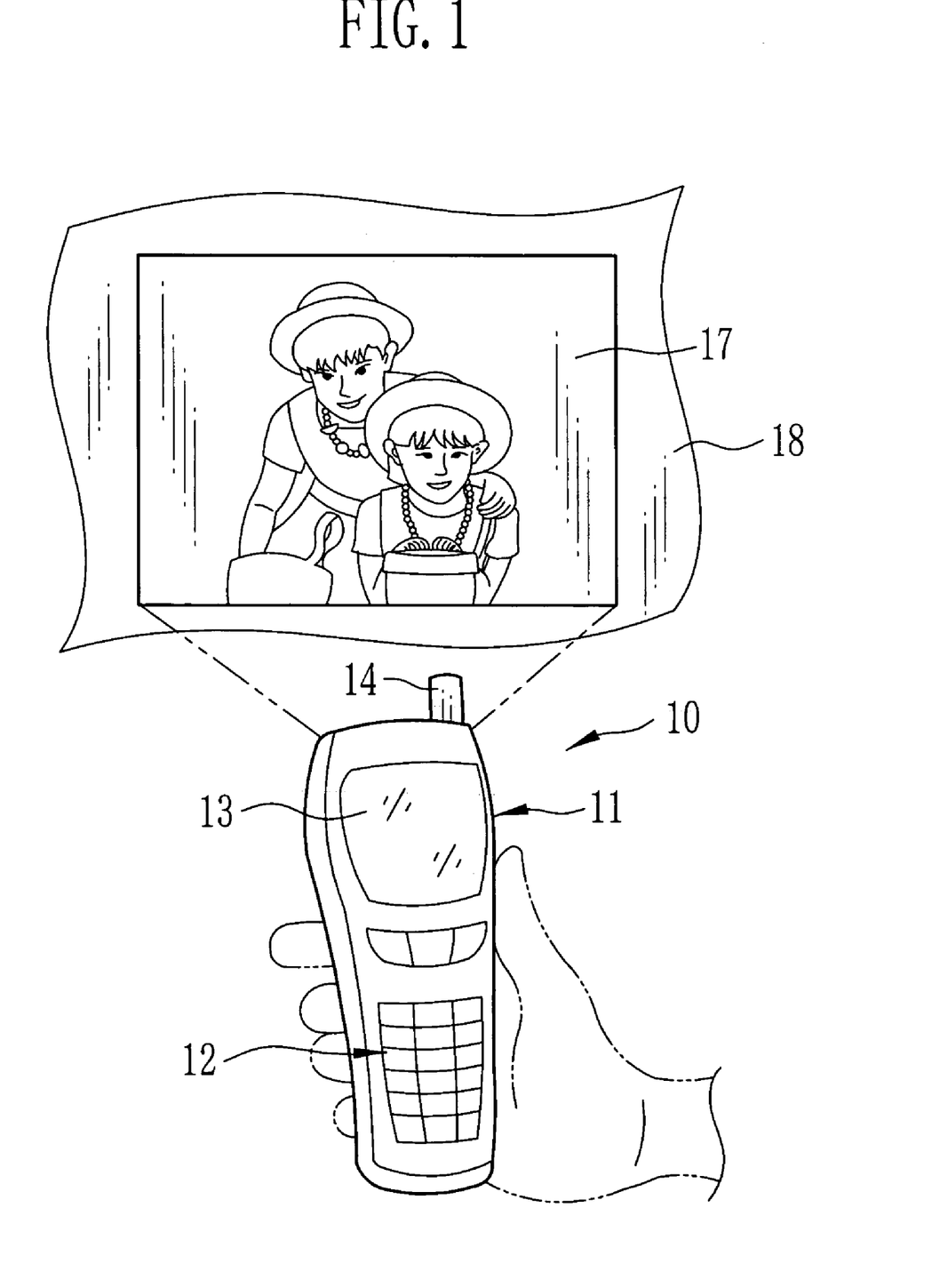
FIG. 1 is an explanatory view showing a state in which a cellular phone incorporating a projection type image display apparatus of the present invention is projecting an image.

In FIG. 1, a cellular phone 10 incorporating a digital camera has a function to record subject images as digital data. The cellular phone 10 also has a function to project the recorded images on a projection surface to display the images. A key panel 12 having cursor and numeric keys arranged thereon and a display panel 13 for displaying a control menu screen and the images are disposed on a front surface of a main body 11 of the cellular phone 10. On a rear surface of the main body 11, a taking lens (not shown) is disposed. An antenna 14 that transmits and receives radio signals is disposed on a top surface of the main body 11.

Figure 2:
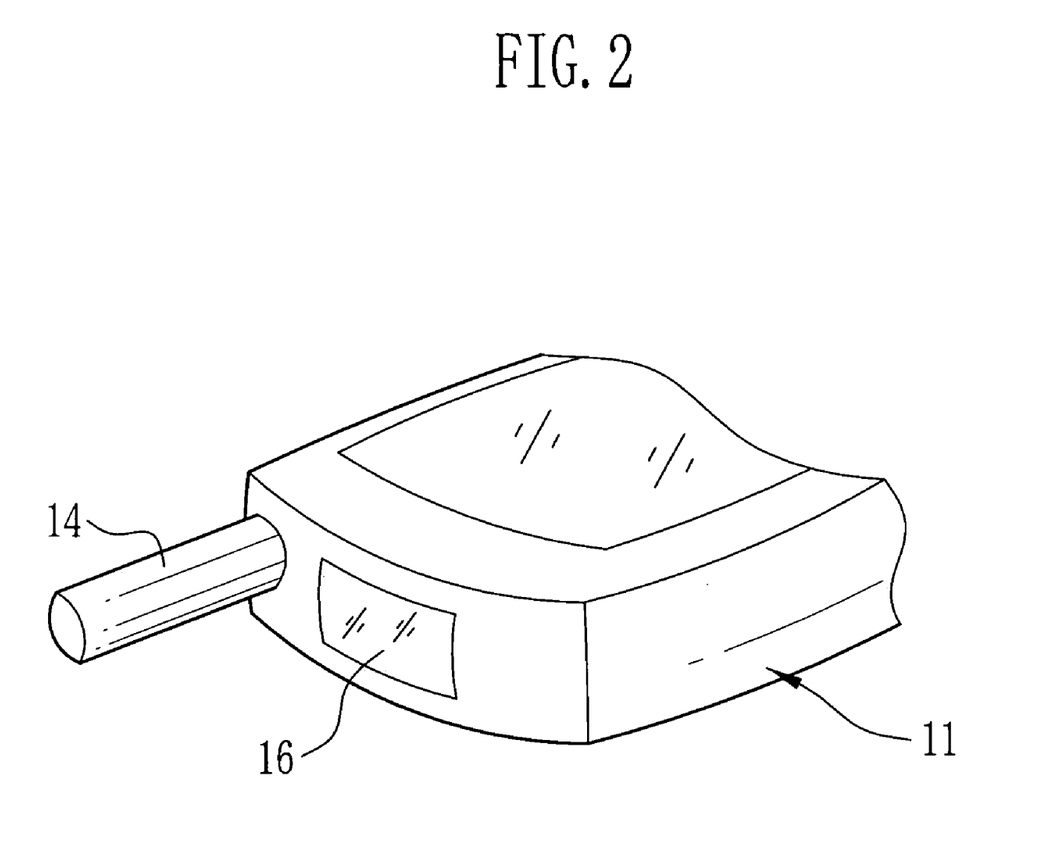
FIG. 2 is an explanatory view showing a projection window.

Inside of the main body 11, a laser source for emitting a laser beam is disposed, and the laser beam is projected toward the outside of the main body 11 through a projection window 16, which is shown in FIG. 2. The projection window 16 is, for instance, an opening shielded with a transparent cover 16a. The laser beam through the projection window 16 is projected on a projection surface 18, such as a wall or a screen, to display an image 17.

Figure 3:
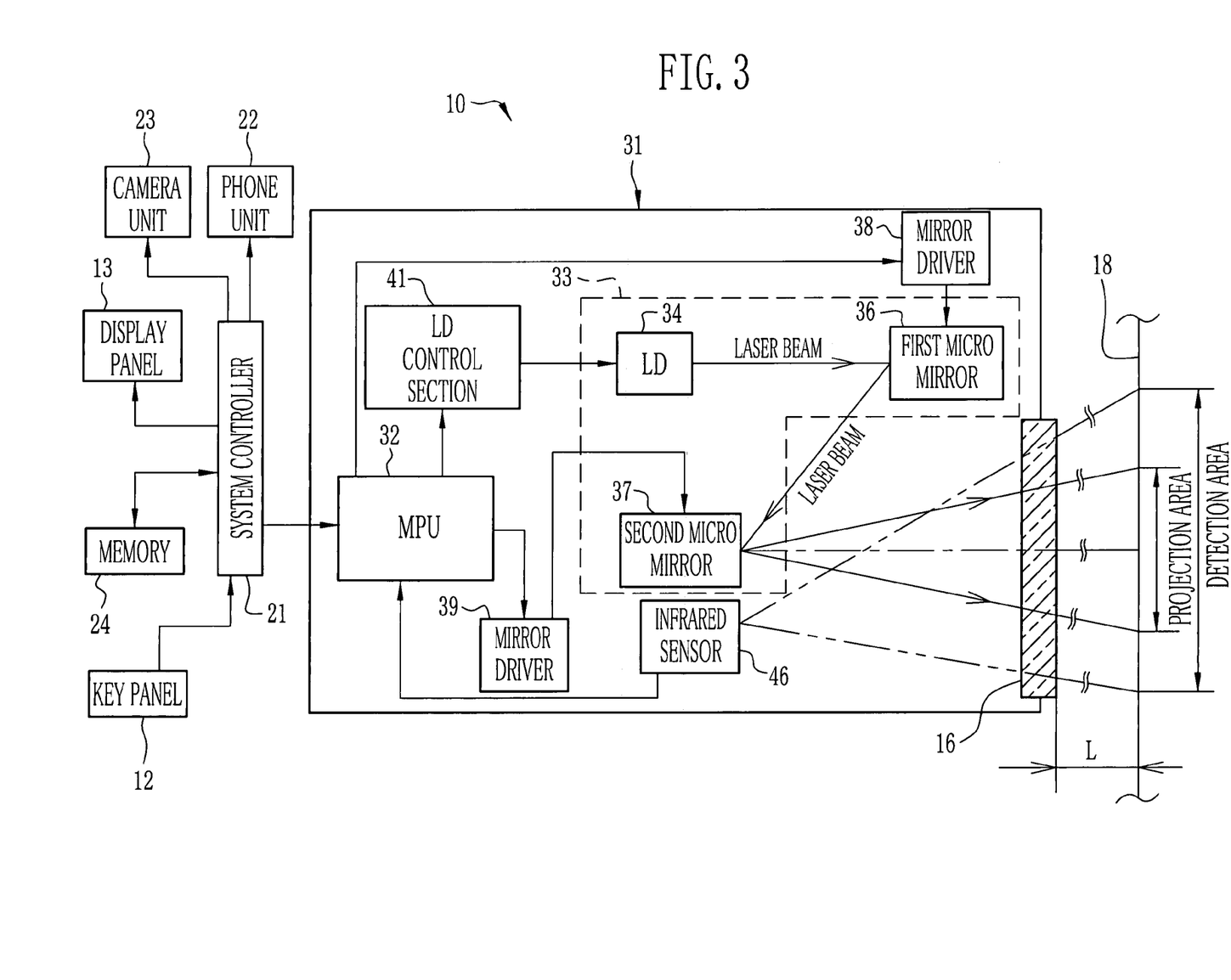
FIG. 3 is a block diagram showing an electronic structure of the cellular phone.

In FIG. 3, a system controller 21 controls every part of the cellular phone 10 in accordance with operation signals inputted from the key panel 12. A phone unit 22 comprises a speaker for outputting voice, a microphone for converting the voice into electric signals, and the like. A camera unit 23 includes the taking lens, an image sensor, such as a CCD, an image processing circuit for processing the images taken with the CCD, and the like. The image data of the subject taken with the camera unit 23 is recorded in a memory 24.

Figure 4:
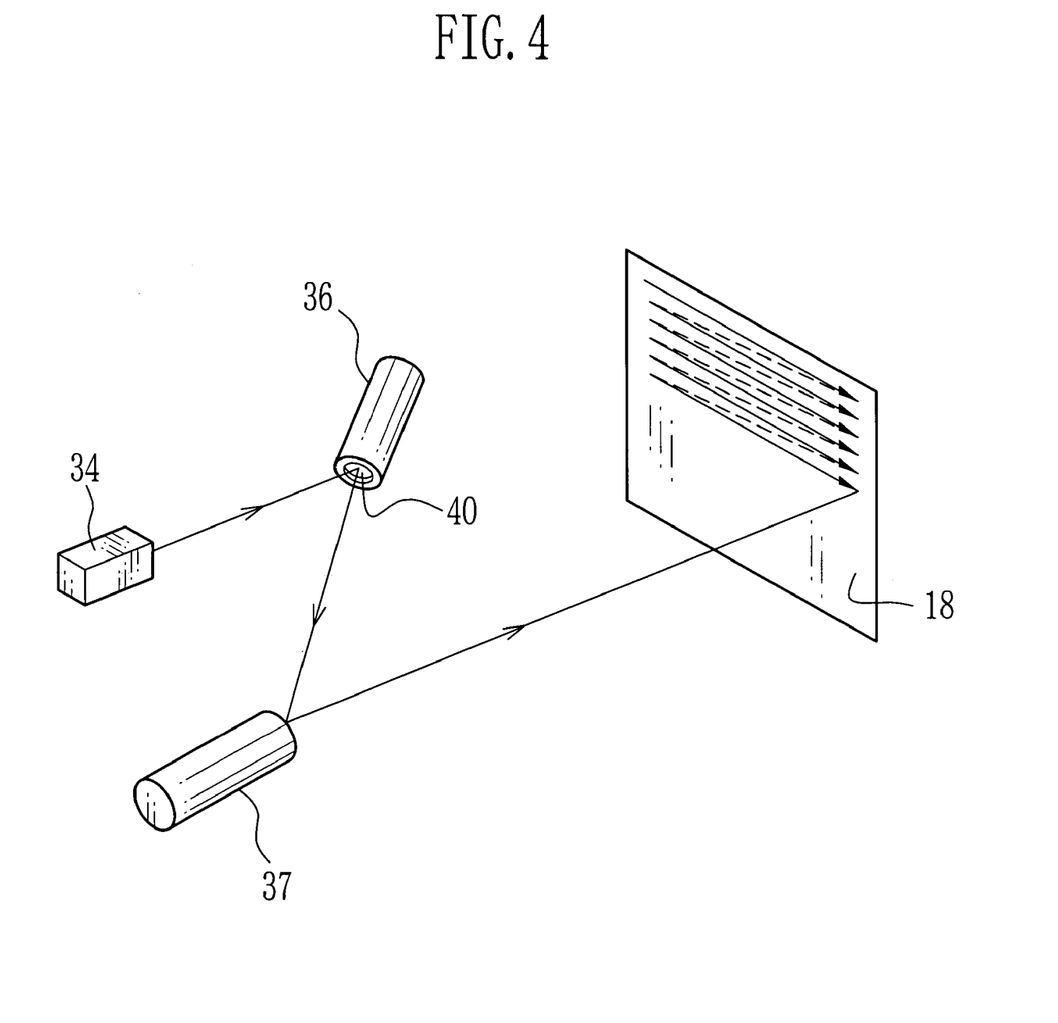
FIG. 4 is an explanatory view showing micro mirrors rendering an image.

A projection unit 31 emits the laser beam and also scans this laser beam to reproduce the image on the projection surface 18. In the projection unit 31, a micro processing unit (MPU) 32 and a laser beam emitting section 33 for emitting the laser beam to be projected on the projection surface 18 are provided. The MPU 32 controls over every part of the projection unit 31 based on commands sent from the system controller 21. As shown in FIG. 4, the laser beam emitting section 33 includes a laser diode (LD) 34 for emitting the one-dimensional laser beam, a first micro mirror 36 that reflects the laser beam from the LD 34 in a horizontal direction, and a second micro mirror 37 that reflects the laser beam from the first micro mirror 36 in a vertical direction. The laser beam reflected on the second micro mirror 37 is projected on the projection surface 18 through the projection window 16. The laser beam from the LD 34 is deflected on the first and second micro mirrors 36 and 37 to render the image on the projection surface 18.

In incorporating a projection unit into small electronic devices, such as the cellular phone 10, the projection unit is required to be made small in dimension. If an LED is utilized, an optical system for collimating diffused light need be provided in the projection unit, since the emission light from the LED diffuses. With this configuration, it is difficult to miniaturize the projection unit. In contrast to that, the LD 34 does not require such collimation optical system since the LD 34 emits the laser beam with high directivity. Therefore, the projection unit with the LD 34 can be made smaller than that with the LED. Additionally, since the laser beam has extremely high directivity, the beam diameter is almost identical across a predetermined range for projection (for instance, 30 cm to 5 m from the LD).

Each of the first and second micro mirrors 36 and 37 is formed into a cylindrical shape having a diameter of, for example, approximately 4 mm, and has a mirror element 40, whose diameter is about 1 mm, disposed swingably at one end. A reflection surface of the mirror element 40 is exposed outside and its rear surface is located on a memory cell. The mirror element 40 is swingable like a seesaw at, for instance, +/−15 degree of angle. The scanning in the horizontal or vertical direction can be made by swinging the mirror element 40. The micro mirror is extremely small as compared with a polygon mirror. Therefore, the projection unit 31 with the micro mirror can be miniaturized.

Note that the micro mirror with a mirror element that can swing in both the horizontal and vertical directions may be utilized in place of the micro mirror used in the present embodiment. However, the micro mirror with the mirror element that swings in both the horizontal and vertical directions is relatively large in dimension. Therefore, it is more advantageous to use two micro mirrors in combination, each of whose mirror element swings in the horizontal direction, alike the present embodiment, in order to miniaturize the unit.

Mirror drivers 38 and 39 drive the first and second micro mirrors 36 and 37 respectively. An LD control section 41 turns ON and OFF the laser beam output of the LD 34 and controls a power level of the laser beam from the LD 34. The LD control section 41 performs tone control of the projected image by adjusting the power level of the laser beam from the LD 34. The micro mirror 36 scans the laser beam in the horizontal direction and the micro mirror 37 scans the laser beam in the vertical direction synchronously with the output timing of the laser beam from the LD 34.

The projection unit 31 is provided with an infrared sensor 46. The infrared sensor 46 detects human presence in a detection area 48 including an optical path of the laser beam extending from the projection window 16 to the projection surface 18 and a peripheral area around the optical path, so that nobody gets the laser beam accidentally. As well known, the infrared sensor 46 detects infrared rays from things that give off heat. The infrared sensor 46 is disposed such that its light receiving surface faces the projection window 16. The infrared sensor 46 receives the infrared rays transmitted through the projection window 16, and then sends electric signals corresponding to the level of the received rays to the MPU 32. The MPU 32 judges whether there is any human presence in the detection area 48 in accordance with the electric signals. The MPU 32 then sends a result of the judgment to the LD control section 41.

After receiving the instruction for displaying the image from the key panel 12, the LD control section 41 investigates whether there is human presence in the detection area 48 based on the result of the judgment of the MPU 32, before outputting the laser beam from the LD 34. The LD control section 41 starts outputting the laser beam when human presence is not detected. On the other hand, the LD control section 41 does not start outputting the laser beam when human presence is detected. When it is judged that someone entered in the detection area 48 while the laser beam is being outputted, the LD control section 41 stops outputting the laser beam from the LD 34. Thus, it is prevented that the laser beam having high energy is accidentally irradiated on the human body. Note that the LD control section 41 may be designated to reduce the power level of the laser beam to the predetermined level on which the laser beam does not harm the human body even being irradiated, instead of stopping the output of the laser beam.

Figure 5:
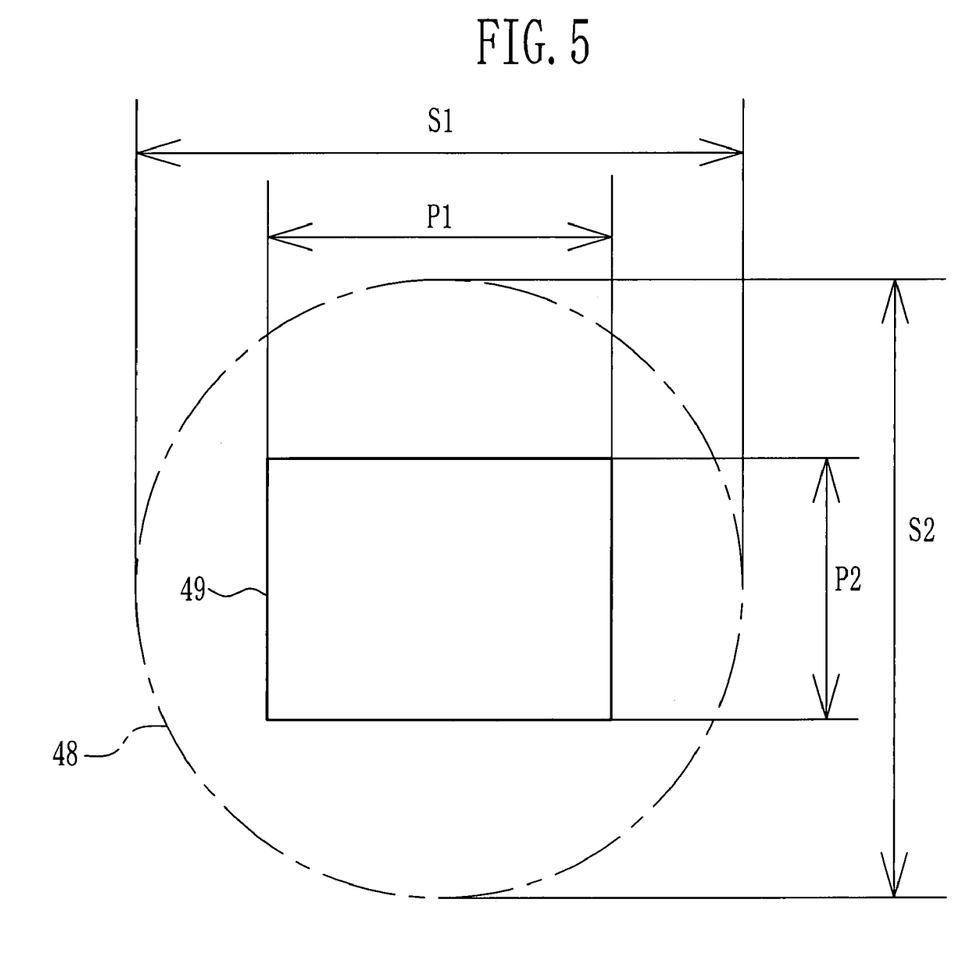
FIG. 5 is an explanatory view showing the size of a detection area in comparison with that of a projection area.
Figure 6:
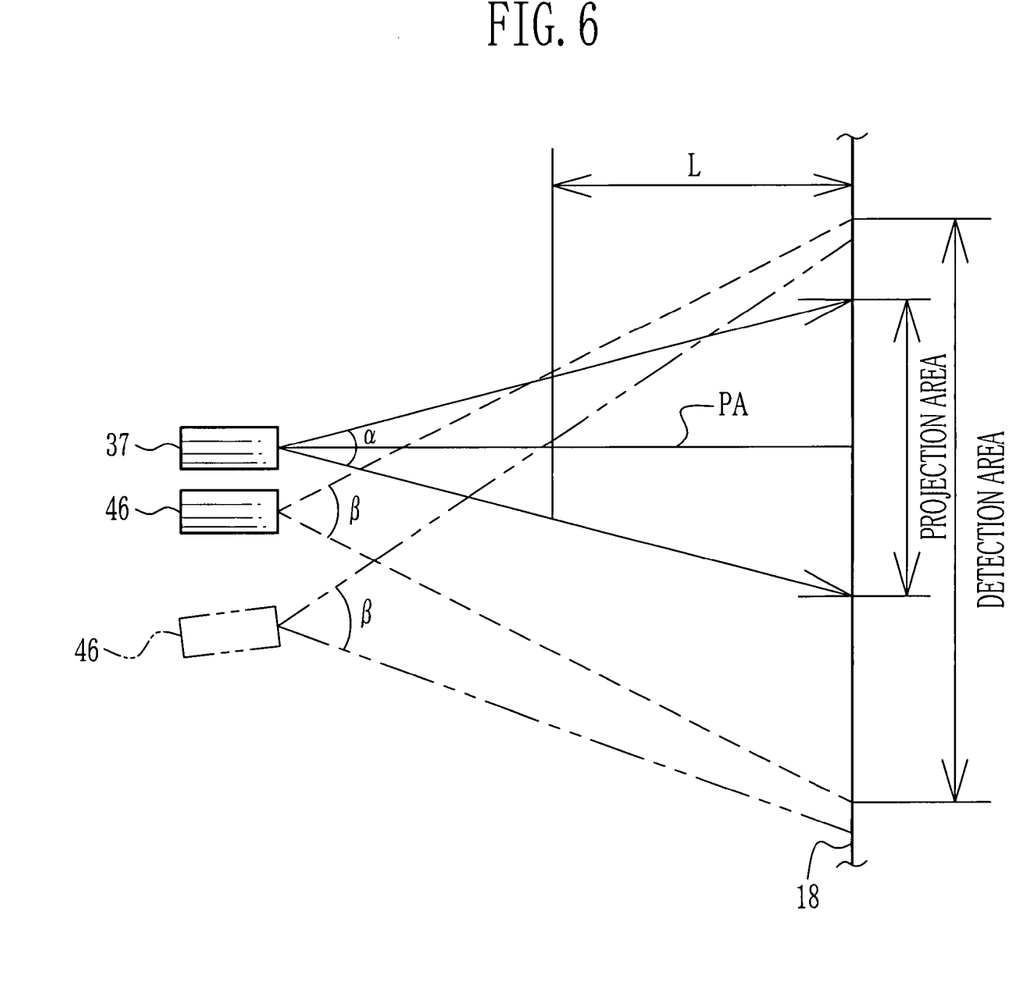
FIG. 6 is an explanatory view showing the disposition of an infrared sensor.
Figure 7:
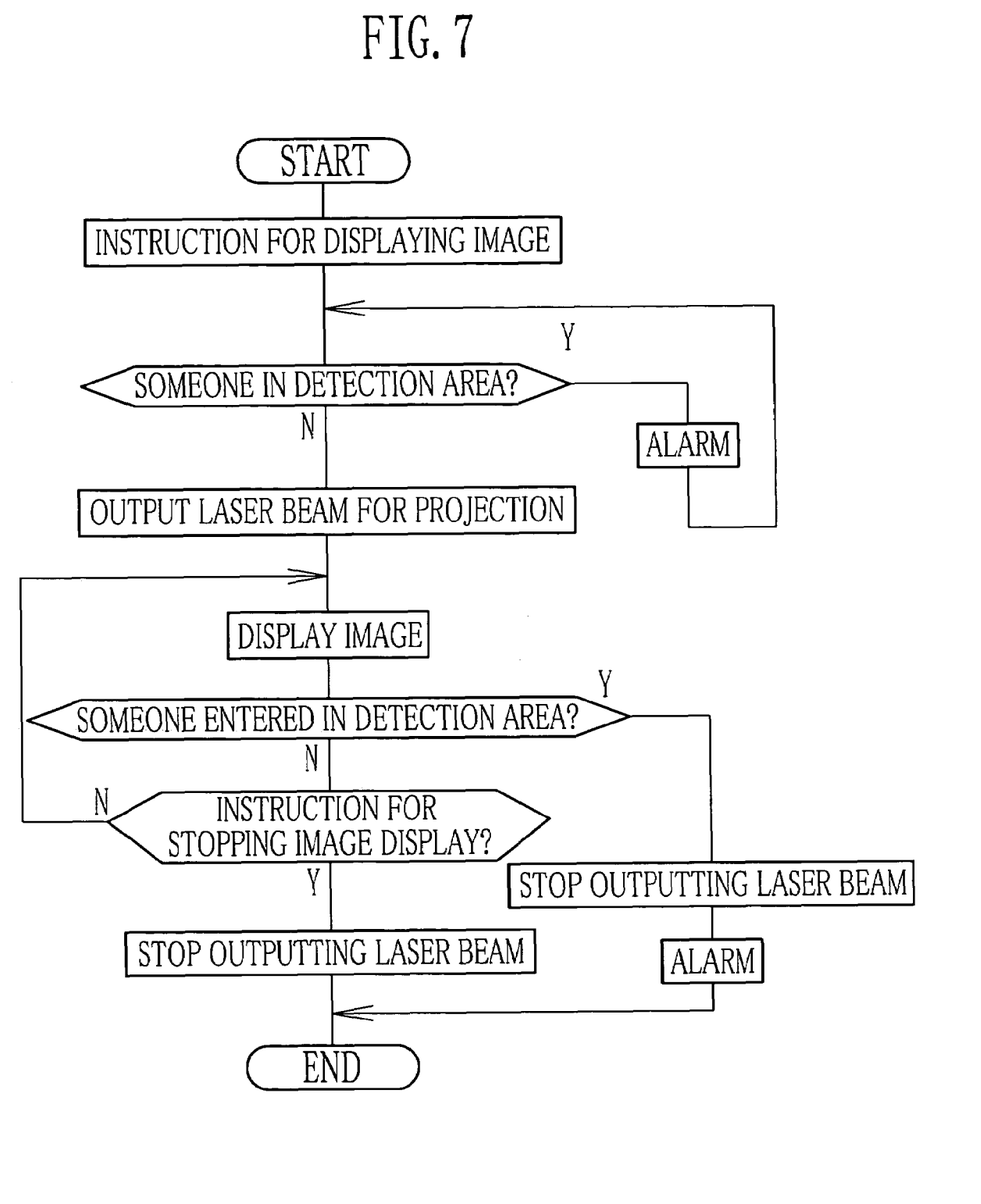
FIG. 7 is a flow chart showing a process for displaying the image.

Such control over the laser beam output must be carried out before someone enters in a projection area 49 of the laser beam. Therefore, light receiving angle β of the infrared sensor 46 is made larger than maximum projection angle α of the laser beam so that the projection area 49 of the laser beam resides within the detection area 48 on the projection surface 18, as shown in FIGS. 5 and 6. By making the detection area 48 larger than the projection area 49, the output of the laser beam is controlled before someone enters the projection area 49. The detection area 48 is defined to include the peripheral area around the projection area 49. The margin of the peripheral area is, for instance, 20 to 25% of the length P1 and width P2 of the projection area 49 respectively, as shown in FIG. 5. The length and width of the detection area 48 may be defined as appropriate based on the sensitivity of the infrared sensor or the response speed of the LD.

As mentioned above, the laser beam has extremely high directivity. Therefore, the image on the projection surface 18 is clear as long as the projection distance between the projection window 16 and the projection surface 18 resides within a predetermined projection range L. That is, the projection distance can be freely set by a user within the projection range L, and it is impossible to decide the relative position of the detection area 48 and the projection area 49 based on a certain projection distance. Therefore, the detection area 48 must be positioned to include the projection area 49 at any point in the projection range L.

For instance, when the infrared sensor 46 is disposed away from a projection axis PA of the laser beam projected on the projection surface 18 through the projection window 16, as shown with a long dashed double-short-dashed line in FIG. 6, the projection area 49 does not reside within the detection area 48 at the light source side in the projection range L. The infrared sensor 46 is therefore disposed near the second micro mirror 37, as shown with a dashed line, so as to be close to the projection axis PA. With this arrangement, the projection area 49 resides within the detection area 48 at any point within the projection range L, and the output of the laser beam can be controlled before someone enters the projection area 49 no matter where the projection surface 18 is in the projection range L. Thus, it is prevented that the laser beam is irradiated on the human body. Note that the projection axis PA is the axis that runs through the center of the scan of the second micro mirror 37.

Hereinafter, the operation of the present invention according to the above configuration is described. When the instruction for displaying the image is made on the key panel 12, the system controller 21 reads the image data from the memory 24 and sends it to the projection unit 31. The MPU 32 in the projection unit 31 then sends the command for displaying the image to the LD control section 41 and the mirror drivers 38 and 39. After receiving the command for displaying the image, the LD control section 41 receives the result of the judgment from the MPU 32 as to whether human presence is detected in the detection area 48. When human presence is detected, the LD control section 41 does not start outputting the laser beam. In this case, a standby signal is sent from the projection unit 31 to the system controller 21. Based on the standby signal, a warning message is displayed on the display panel 13. On the other hand, when the LD control section 41 receives the result of the judgment that human presence is not detected in the detection area 48 or the person has gone out of the detection area 48, the LD control section 41 starts outputting the laser beam from the LD 34.

The LD 34 outputs the laser beam with intensity that corresponds to the image data of each pixel. The laser beam outputted from the LD 34 is deflected by the first and second micro mirrors 36 and 37 and is projected on the projection surface 18 through the projection window 16. The laser beam continuously outputted from the LD 34 is scanned in the horizontal direction by the first micro mirror 36 and in the vertical direction by the second micro mirror 37. Thus, the scanned image is kept displayed on the projection surface 18. The image is displayed until a stop instruction of the image display is made on the key panel 12.

While the image is being displayed, the MPU 32 is monitoring whether any person enters the detection area 48 with the infrared sensor 46. When the MPU 32 judges that someone entered the detection area 48, the MPU 32 sends the result of the judgment to the LD control section 41. Upon receiving the result of the judgment, the LD control section 41 stops outputting the laser beam immediately, even without the stop instruction from the key panel 12. Thus, it is prevented that the laser beam is irradiated on the human body. At this time, the warning message, such as "Human presence is detected in detection area, and laser beam is stopped", may be displayed on the display panel 13.

After the output of the laser beam is stopped forcedly by detecting human presence, the LD control section 41 may be designated to resume the output of the laser beam automatically when it is judged that the person has gone out of the detection area 48 by investigating the detection area 48. It is possible to resume the output of the laser beam in the same way when the power level of the laser beam is reduced instead of stopping the output of the laser beam.

Figure 8:
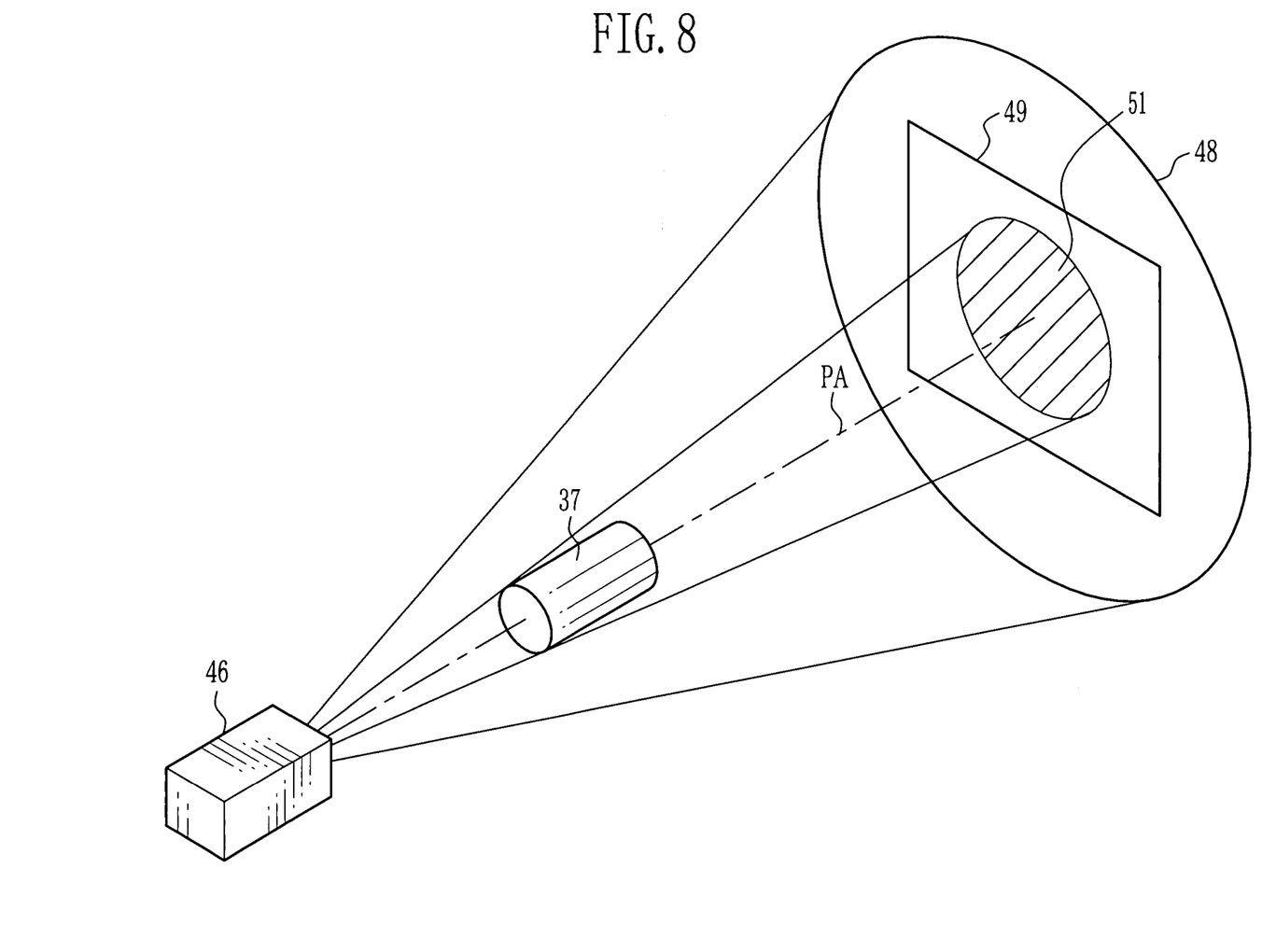
FIG. 8 is an explanatory view showing an example in which the infrared sensor is disposed behind the micro mirror.

In the above embodiment, the infrared sensor 46 is disposed near the projection axis PA. However, it is also possible to dispose the infrared sensor 46 behind the second micro mirror 37 and align the center of the light receiving surface of the infrared sensor 46 to the projection axis PA. When the infrared sensor 46 is disposed near the projection axis PA as the above embodiment, the center of the light receiving surface of the infrared sensor 46 does not coincide with the projection axis PA, so the top and bottom areas and the right and left areas around the projection area 49 in the detection area 48 become asymmetrical. Such problem is solved by aligning the center of the light receiving surface to the projection axis PA.

However, when the infrared sensor 46 is disposed behind the second micro mirror 37, a blind area 51, which is created due to the second micro mirror 37 casting a shadow, appears on the projection surface 18. If the blind area 51 is larger than the projection area 49, it is difficult to detect human presence around the projection area 49. Therefore, it is necessary to determine a spacing X between the infrared sensor 46 and the second micro mirror 37 such that the blind area 51 is included within the projection area 49.

Figure 9:
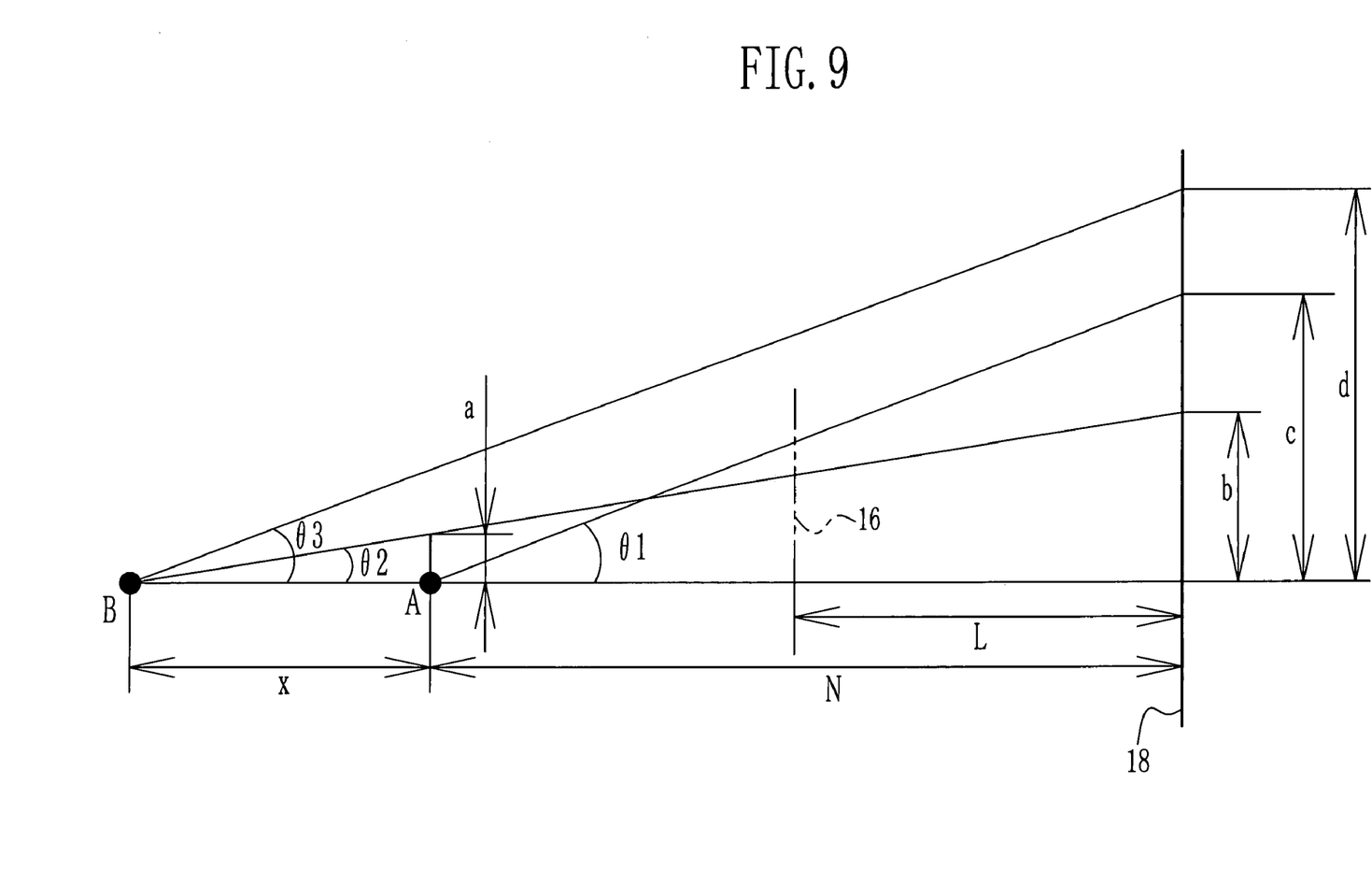
FIG. 9 is an explanatory view showing a condition to keep a blind area of the infrared sensor within the projection area.

As shown in FIG. 9, a trailing end position of the second micro mirror 37 is represented as A, and the position of the light receiving surface of the infrared sensor 46 is represented as B. The height of the second micro mirror 37 from the projection axis PA is represented as a, and the distance from the reflection surface (light exit surface) of the second micro mirror 37 to the projection surface 18 is represented as N. The height of the detection area 48 of the infrared sensor 46 from the projection axis PA is represented as d. The height of the projection area 49 from the projection axis PA is represented as c. The height of the blind area 51 from the projection axis PA is represented as b. The maximum projection angle of the laser beam of the second micro mirror 37 from the projection axis PA is represented as $\theta 1$. The angle of the shadow creating the blind area 51 from the projection axis PA is represented as $\theta 2$. The light receiving angle of the infrared sensor 46 from the projection axis PA is represented as $\theta 3$.

Here, the spacing X (the distance between the light receiving surface of the infrared sensor 46 and the trailing end position of the second micro mirror 37) is determined as follows.

In order to include the blind area 51 within the projection area 49, the following conditions 1 and 2 are satisfied:

$$c > b \quad \text{(condition 1); and}$$

$$\theta 1 \geq \theta 3 \quad \text{(condition 2).}$$

The b and c are calculated as $[b=(N+X)\tan \theta 2]$ and $[c=N \tan \theta 1]$. Therefore, the following equation 1 is obtained based on the above condition 1:

$$N \tan \theta 1 > (N+1)\tan \theta 2 = (N+X)a/X \quad \text{(Equ. 1).}$$

The equation 1 is modified as follows:

$$NX \tan \theta 1 > aN + aX$$

$$(N \tan \theta 1 - a)X > aN$$

$$X > aN/N \tan \theta 1 - a.$$

Therefore, the condition 1 is expressed by the following equation 2:

$$X > aN/N \tan \theta 1 - a \quad \text{(Equ. 2).}$$

The spacing X is determined so as to satisfy the equation 2 and the condition 2.

Although the micro mirror is utilized as the laser beam deflector in the above embodiment, it is possible to utilize other deflectors, such as the polygon mirror or the like. In the above embodiment, the one-dimensional laser beam is modulated for rendering images to be displayed on the projection surface. However, it is also possible to convert the one-dimensional laser beam into a two-dimensional laser beam and optically modulates it by a liquid crystal panel to produce the two-dimensional laser beam having tone. The two-dimensional laser beam with tone is projected on the projection surface to display the images. That is, the liquid crystal panel is disposed between the micro mirror 37 and the projection window 16, thereby optically modulating the laser beam at a constant intensity emitted from the laser source 34.

Note that the optical part disposed in front of the infrared sensor is the laser beam deflector in the above embodiment. Instead, another optical part composing the light emitting section can be placed in front of the infrared sensor as long as it regulates the projection axis of the laser beam projected through the projection window.

In the above embodiment, the projection type image display apparatus of the present invention is incorporated into the cellular phone. However, the projection type image display apparatus may be incorporated into other electronic devices, such as PDA, digital camera, portable computer and the like. It is also possible that the projection type image display apparatus is not incorporated into the electronic devices, but is made independently for its purpose. Moreover, it is possible that the projection type image display apparatus displays color images by use of the laser beams of three colors.

As described so far, the present invention is not to be limited to the above embodiments, and all matter contained herein is illustrative and does not limit the scope of the present invention. Thus, obvious modifications may be made within the spirit and scope of the appended claims.

What is claimed is:

1. A projection type image display apparatus for projecting a laser beam on a projection surface through a projection window of a main body to display images, comprising:
    a main body having a laser beam emitting section for emitting said laser beam, said laser beam emitting section including
        a laser source for emitting said laser beam;
        a first laser beam deflector for deflecting said laser beam from said laser source to scan said laser beam either in a horizontal or a vertical direction; and
        a second laser beam deflector for deflecting said laser beam from said first laser beam deflector to scan said laser beam in the other direction;
    an infrared sensor for detecting human presence in a detection area including a projection area of said laser beam extending from said projection window to said projection surface and a peripheral area around said projection area, said infrared sensor having a light receiving angle larger than a maximum projection angle of said laser beam projected through said projection window; and
    a laser beam power controller for controlling a power level of said laser beam to a predetermined level when said infrared sensor detects human presence in said detection area while said laser beam is being outputted,
    wherein said infrared sensor is disposed behind said second deflector and aligned to said projection axis of said laser beam projected through said projection window.

2. A projection type image display apparatus claimed in claim 1, wherein said laser beam power controller starts outputting said laser beam from said laser beam emitting section after investigating human presence in said detection area with using said human detector.

3. A projection type image display apparatus claimed in claim 1, wherein said detection area on said projection surface includes said projection area of said laser beam and said peripheral area around said projection area, said peripheral area having a margin that is 25% of the length and width of said projection area.

4. A projection type image display apparatus claimed in claim 1, wherein said infrared sensor is disposed near a projection axis of said laser beam.

5. A projection type image display apparatus claimed in claim 1, wherein a spacing between said infrared sensor and said second deflector is designated such that a blind area, which is created in said detection area of said infrared sensor due to said second deflector disposed in front of said infrared sensor casting a shadow on said projection surface, is included within said projection area of said laser beam on said projection surface.

* * * * *